(12) United States Patent
Shiga

(10) Patent No.: US 9,558,866 B2
(45) Date of Patent: Jan. 31, 2017

(54) WIRE HARNESS

(71) Applicant: SUMITOMO WIRING SYSTEMS, LTD., Mie (JP)

(72) Inventor: Koki Shiga, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 20 days.

(21) Appl. No.: 14/431,889

(22) PCT Filed: Aug. 21, 2013

(86) PCT No.: PCT/JP2013/072251
§ 371 (c)(1),
(2) Date: Mar. 27, 2015

(87) PCT Pub. No.: WO2014/054348
PCT Pub. Date: Apr. 10, 2014

(65) Prior Publication Data
US 2015/0287497 A1    Oct. 8, 2015

(30) Foreign Application Priority Data

Oct. 5, 2012 (JP) .................................. 2012-223116

(51) Int. Cl.
*H01R 4/00* (2006.01)
*H01B 7/282* (2006.01)
(Continued)

(52) U.S. Cl.
CPC ......... *H01B 7/2825* (2013.01); *B60R 16/0215* (2013.01); *H02G 3/06* (2013.01);
(Continued)

(58) Field of Classification Search
CPC ....... H01R 9/032; H01R 13/655; H01R 24/56; H02G 1/00; H01B 4/182
(Continued)

(56) References Cited

U.S. PATENT DOCUMENTS 6,864,426 B2 * 3/2005 Miyazaki ............. H01R 13/655
174/75 C
7,094,970 B2 * 8/2006 Kihira ................. B60L 11/1803
174/74 R
(Continued)

FOREIGN PATENT DOCUMENTS

JP      2004-171952    6/2004
JP      2006-164702    6/2006
(Continued)

OTHER PUBLICATIONS

Search report from PCT/JP2013/072251, mail date is Oct. 22, 2013.

*Primary Examiner* — William H Mayo, III
(74) *Attorney, Agent, or Firm* — Greenblum & Bernstein, P.L.C.

(57) ABSTRACT

A wire harness including a metal pipe into which an electrical wire is inserted, a metal braided section that covers the electrical wire drawn out from the metal pipe and is formed by braiding metal bare wires that are made of a different type of metal from that of the metal pipe, and a joint pipe to one end of which the metal pipe is connected and to the other end of which the metal braided section is connected. The joint pipe is made of the same type of metal as the metal braided section or of an insulating material.

5 Claims, 6 Drawing Sheets

(51) Int. Cl.
    *B60R 16/02*    (2006.01)
    *H02G 3/06*    (2006.01)
    *H01R 4/02*    (2006.01)
    *H02G 3/04*    (2006.01)

(52) U.S. Cl.
    CPC .................. *H01R 4/00* (2013.01); *H01R 4/02* (2013.01); *H02G 3/0418* (2013.01); *H02G 3/0481* (2013.01)

(58) Field of Classification Search
    USPC ...... 174/70 R, 72 R, 72 A, 74 R, 84 R, 84 C
    See application file for complete search history.

(56) References Cited

U.S. PATENT DOCUMENTS

| | | | | |
|---|---|---|---|---|
| 8,981,221 | B2* | 3/2015 | Sawada | B60R 16/0215 174/102 R |
| 2002/0157843 | A1* | 10/2002 | Fukushima | H01R 9/032 174/353 |
| 2004/0099427 | A1* | 5/2004 | Kihira | B60L 11/1803 174/359 |
| 2006/0137893 | A1* | 6/2006 | Sumi | H01R 24/562 174/84 R |
| 2011/0088944 | A1* | 4/2011 | Ogue | B60R 16/0215 174/72 A |
| 2012/0305308 | A1* | 12/2012 | Toyama | B60R 16/0207 174/70 R |
| 2012/0312597 | A1* | 12/2012 | Toyama | H01R 4/182 174/84 C |
| 2013/0008711 | A1* | 1/2013 | Toyama | B60R 16/0215 174/70 R |
| 2013/0118800 | A1* | 5/2013 | Toyama | H05K 9/0007 174/72 A |
| 2013/0140054 | A1* | 6/2013 | Kato | H02G 1/00 174/68.3 |
| 2013/0153292 | A1* | 6/2013 | Adachi | B60K 28/14 174/70 R |
| 2013/0299234 | A1* | 11/2013 | Izawa | H02G 3/0406 174/70 R |
| 2014/0202762 | A1* | 7/2014 | Adachi | H01R 13/6599 174/72 A |

FOREIGN PATENT DOCUMENTS

| | | |
|---|---|---|
| JP | 2006-311699 | 11/2006 |
| JP | 2009-180335 | 8/2009 |
| JP | 2009-272133 | 11/2009 |
| JP | 2012-113949 | 6/2012 |

\* cited by examiner

FIG. 3 ( A )
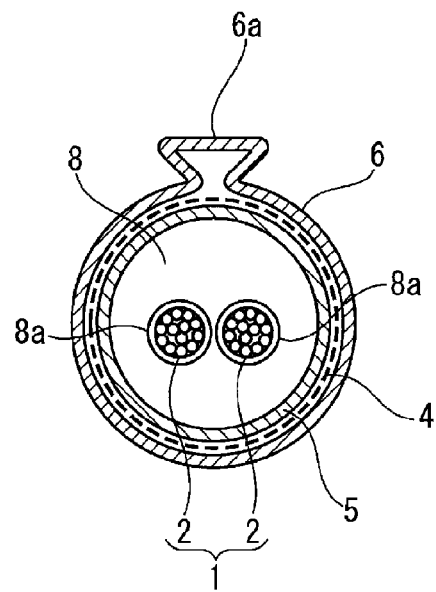
FIG. 3 ( B )
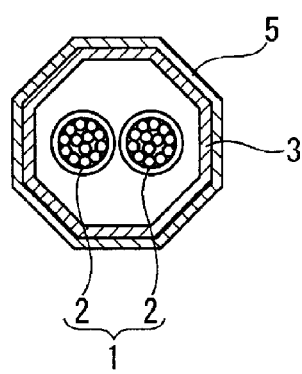

FIG. 9 ( A )
- PRIOR ART -
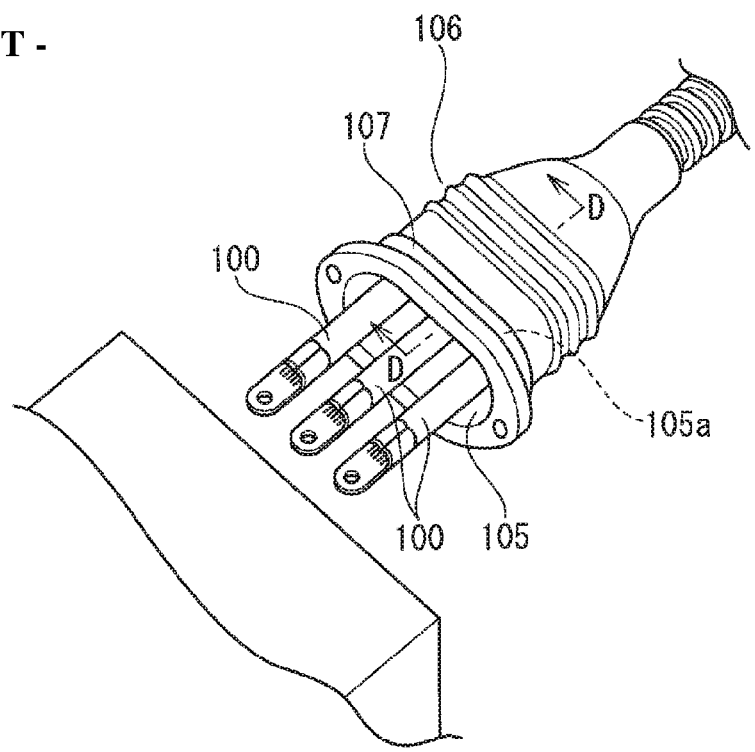
FIG. 9 ( B )
- PRIOR ART -
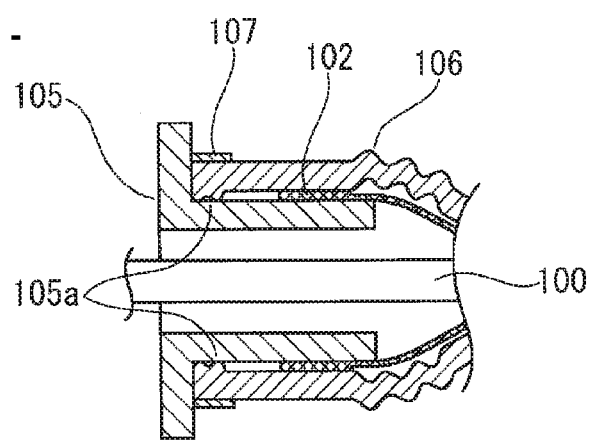

WIRE HARNESS

TECHNICAL FIELD

The present invention relates to a wire harness, and in particular to a wire harness in which a metal pipe into which electrical wires constituting the wire harness are inserted and a metal braided section into which the electrical wires drawn out from the metal pipe are inserted are connected to each other without causing corrosion.

BACKGROUND ART

Conventionally, in hybrid cars and electric cars, it is often the case that electrical wires of a wire harness routed, for example, between a battery and an inverter or between the inverter and a motor are inserted into a metal pipe and then laid out. For example, in JP 2006-311699A (Patent Document 1), as shown in FIG. 8, electrical wires 100 of a wire harness are inserted into a metal pipe (shield pipe) 101 in a wiring region under and along the floor of a vehicle body. The insertion of the electrical wires 100 into the metal pipe 101 can achieve shielding, and enables the electrical wires 100 to be protected against interfering objects such as stones flying from the road surface or the like. Furthermore, in a curved wiring region such as an engine room that has a cramped space, the electrical wires 100 drawn out from the metal pipe 101 are inserted into a metal braided section (flexible shield member) 102 and then laid out. The metal braided section 102 is obtained by braiding metal bare wires into a mesh, and the metal pipe 101 and the metal braided section 102 are conductively connected to each other by an end of the metal pipe 101 being covered with an end of the metal braided section 102, and the metal pipe 101 and the metal braided section 102 being crimped by a crimp ring 103 mounted on the outer circumference of the metal braided section 102. Furthermore, a rubber grommet 104 that is used for the purpose of, for example, waterproofing is externally fitted to the metal braided section 102 from a connection section at which the metal pipe 101 and the metal braided section 102 are connected to each other.

CITATION LIST

Patent Documents

Patent Document 1: JP 2006-311699A

SUMMARY OF INVENTION

Technical Problem

Meanwhile, in the above-described conventional configuration, the entire region from a connection section S at which the metal pipe 101 and the metal braided section 102 are connected to each other to a connector section 105 (see FIGS. 9(A) and 9(B)) on the terminal end side of the electrical wires 100 inserted through the metal braided section 102 is set as a completely waterproofed region, in order to prevent a contact section in which the metal pipe 101 and the metal braided section 102 are in contact with each other from getting wet. Therefore, there is the problem that water-stopping members such as the rubber grommet 104 and a rubber connector boot 106 mounted on the connector section 105 are needed, resulting in a complicated structure. Particularly, when the connector boot 106 is fixed to the connector section 105 in an intimate manner using a crimp ring 107 or the like, the need arises to provide a sealing planer section 105a on the connector section 105, causing the problem that the connector section 105 becomes large.

Accordingly, a structure has been considered in which the connector section 105 does not have the water-stopping structure and is thus not large, but in this case, there is the risk that the contact section in which the metal pipe 101 and the metal braided section 102 are in contact with each other gets wet, and water enters the metal pipe. The metal pipe 101 is made of aluminum-based metal, iron-based metal, or the like, whereas the metal braided section 102 is often made from a different type of metal from that of the metal pipe 101, such as copper-based metal bare wires whose surfaces are tin-plated. Accordingly, in the structure in which the metal pipe 101 is covered with the metal braided section 102 made of a different type of metal, and the metal pipe 101 and the metal braided section 102 are fixed by the crimp ring 103, there is the problem that the contact section in which the metal pipe 101 and the metal braided section 102 are in contact with each other easily (electrochemically) corrodes by getting wet. Furthermore, the metal pipe 101, when having corroded, may neither protect electrical wires inside the metal pipe 101 nor exert the shielding function.

The present invention was made in view of the above-described problems, and it is an object of the present invention to provide a wire harness that can prevent corrosion in the connection section at which the metal pipe and the metal braided section are connected to each other, even when a completely waterproofed region is not formed.

Solution to Problem

In order to achieve this object, the present invention relates to a wire harness including: a metal pipe into which an electrical wire is inserted; a metal braided section that covers the electrical wire that is drawn out from the metal pipe, the metal braided section being formed by braiding metal bare wires; and a joint pipe to one end of which the metal pipe is connected, and to the other end of which the metal braided section is connected, the joint pipe being made of the same type of metal as the metal braided section or of an insulating material.

As described above, in the present invention, the metal pipe and the metal braided section are connected via the joint pipe that is made of the same type of metal as the metal braided section or of an insulating material. Therefore, even when a contact section in which the joint pipe and the metal braided section are in contact with each other gets wet, occurrence of electrochemical corrosion as in the conventional case is not possible.

An elastic water-stopping member through which the electrical wire is inserted while being in intimate contact therewith may be provided inward of a connection section at which the joint pipe and the metal pipe are connected to each other, the elastic water-stopping member being provided such that an outer circumferential surface thereof is in intimate contact with an inner circumferential surface of the connection section.

According to such a configuration, it is possible to prevent water from entering the metal pipe.

Furthermore, a retainer that abuts against the elastic water-stopping member in an axial direction and positions the elastic water-stopping member in the axial direction may be provided inward of the connection section at which the joint pipe and the metal pipe are connected to each other.

According to such a configuration, it is possible to position the elastic water-stopping member at a predetermined position in the axial direction by the retainer abutting against the elastic water-stopping member.

The connection section at which the joint pipe and the metal pipe are connected to each other may be crimped from the outer circumferential surface side into a polygonal shape.

According to such a configuration, the fixing strength between the joint pipe and the metal pipe is enhanced, making it possible to mitigate entry of water into a space between the joint pipe and the metal pipe.

A configuration may be such that the metal pipe is inserted into and connected to the joint pipe, and the metal pipe has a projection against which one end of the joint pipe is capable of abutting, the projection being formed at a position on the outer circumferential surface of the metal pipe that is close to an end thereof.

According to such a configuration, the metal pipe is preferably provided with the projection against which one end of the joint pipe abuts and that holds the joint pipe. With this configuration, the metal pipe and the joint pipe are positioned, and it is possible to prevent the phenomenon that the metal pipe is inserted into the joint pipe more than it is necessary and the elastic water-stopping member cannot internally be fitted and fixed at an appropriate position.

A seal section may be formed over the entire circumference of a part in which the one end of the joint pipe abuts against the projection, the seal section preventing entry of water from the part in which the one end of the joint pipe abuts against the projection.

Accordingly, it is possible to effectively prevent entry of water from the outer circumferential surface side of the joint pipe into a space between the inner circumferential surface of the joint pipe and the outer circumferential surface of the metal pipe, that is, a section in which the joint pipe and the metal pipe are fitted and in contact with each other.

A configuration may be such that the retainer extends to a side opposite to the side on which the retainer abuts against the elastic water-stopping member, and is folded back to an outer circumferential side, and an end of the joint pipe is inserted into a recess that is formed in the folded-back section to a depth at which the end of the joint pipe abuts against the bottom of the recess.

According to such a configuration, since the retainer itself is positioned with respect to the axial direction, it is possible to position the elastic water-stopping member with accuracy.

Advantageous Effects of Invention

According to the present invention, the metal pipe and the metal braided section are connected to each other via a joint pipe that is made of the same type of metal as the metal braided section or of an insulating material. Accordingly, even when the metal pipe and the metal braided section are made of different types of metal, there is no risk of occurrence of electrochemical corrosion.

BRIEF DESCRIPTION OF DRAWINGS

FIG. 3(A) is a cross-sectional view taken along the line B-B of FIG. 2, and FIG. 3(B) is a cross-sectional view taken along the line C-C of FIG. 2.

FIGS. 9(A) and 9(B) show a conventional example, where FIG. 9(A) is a schematic perspective view showing the terminal side of a wire harness and FIG. 9(B) is a cross-sectional view taken along the line D-D of FIG. 9(A).

DESCRIPTION OF EMBODIMENTS

Hereinafter, embodiments of the present invention will be described with reference to the drawings.

Figure 1:
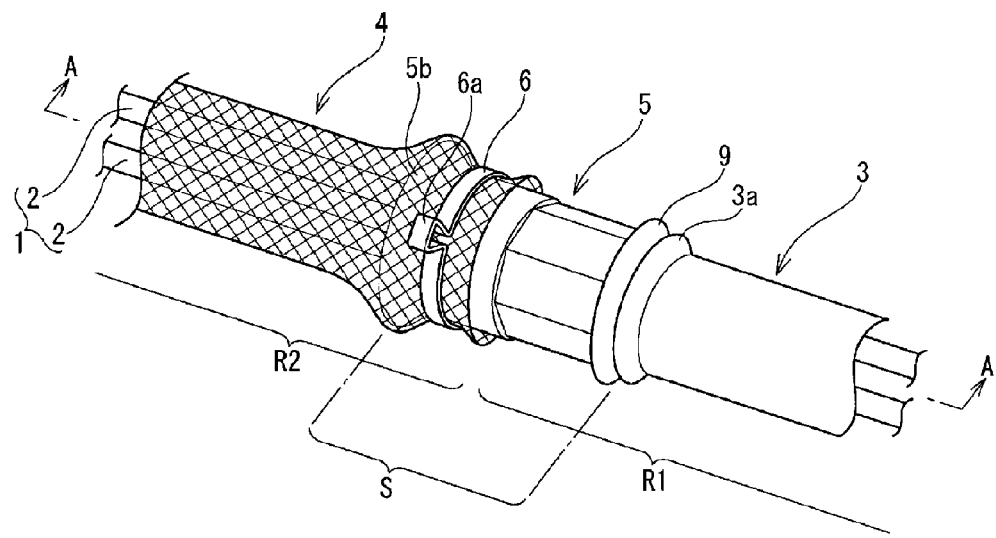
FIG. 1 is a schematic perspective view showing a part of a wire harness according to a first embodiment.
Figure 2:
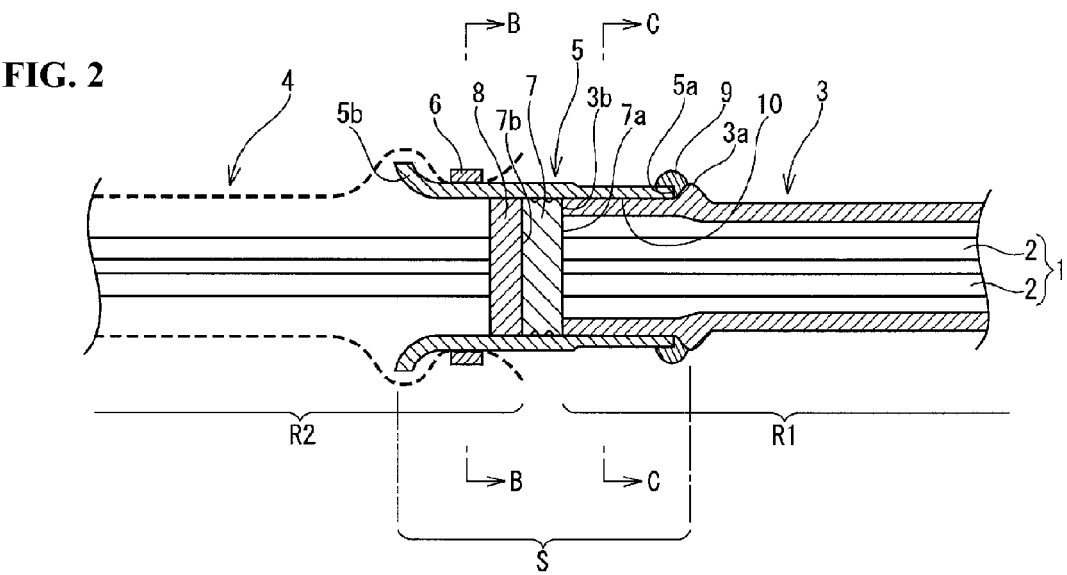
FIG. 2 is a cross-sectional view taken along the line A-A of FIG. 1.

FIGS. 1 to 3 show a first embodiment of the present invention. According to the present embodiment, in a hybrid car, a wire harness 1 constituted by two high-voltage electrical wires 2 (hereinafter, referred to as electrical wires) is routed between a battery that is mounted in a vehicle interior (not shown) on the rear side and an inverter that is mounted in an engine room (not shown) on the front side. Note that the high-voltage electrical wires 2 are insulating-coated electrical wires in which an insulating-coated layer is provided on the outer circumference of a core wire, which is made from twisted wires.

The wiring region of the wire harness 1 includes a first region R1 in which the wire harness 1 is led out from the rear side and laid out under and along the floor (not shown) of the vehicle, and a second region R2 that is contiguous to the first region R1, and in which the wire harness 1 is laid out in the engine room on the front side. As shown in FIGS. 1 and 2, in the first region R1, the two electrical wires 2 are laid out while being inserted through one metal pipe 3 made of aluminum-based metal. Furthermore, in the second region R2, the two electrical wires 2 are laid out while being inserted through one metal braided section 4. The metal braided section 4 is made of a type of metal different from the aluminum-based metal of which the metal pipe 3 is made, and is specifically formed by braiding copper-based metal bare wires whose surfaces are tin plated into a mesh. Note that a corrugated tube made of a resin, although it is not shown, is externally fitted to the metal braided section 4 in the second region R2.

The metal pipe 3 and the metal braided section 4 are conductively connected to each other via a joint pipe 5 that is made of the same type of metal as the metal braided section 4. Specifically, the joint pipe 5 is made of iron-based metal whose surface is tin-plated, and has a structure in which an end of the metal pipe 3 is internally fitted and fixed to the joint pipe 5 from one end thereof, the outer circumferential surface of the joint pipe 5 on the other end is covered with an end of the metal braided section 4, and the metal braided section 4 and the joint pipe 5 are crimped and fixed to each other by a crimp ring 6 that is mounted on the outer circumference of the metal braided section 4 (see FIG. 3(A)). The crimp ring 6 is a ring-shaped metal band made of stainless-steel, and is partially provided with a crimping projection 6a.

Furthermore, the outer circumferential surface of the metal pipe 3 is provided with a projection 3a against which an end surface 5a on one end of the joint pipe 5 that is externally fitted to the metal pipe 3 abuts and that holds the end surface 5a, the projection 3a being provided in a continuous manner in the circumferential direction of the metal pipe 3.

A rubber stopper 7 (elastic water-stopping member) is internally fitted and fixed to the joint pipe 5, the rubber stopper 7 having through-holes (not shown) through which the electrical wires 2 of the wire harness 1 are inserted while being in intimate contact therewith, preventing water from entering the metal pipe 3 in the first region R1 from the metal braided section 4 in the second region R2. At that time, one end surface 7a of the rubber stopper 7 abuts against an end surface 3b of the metal pipe 3 that is internally fitted and fixed to the joint pipe 5, and a resin retainer 8 for pressing the rubber stopper is internally fitted and fixed to the joint pipe 5 so as to abut against the other end surface 7b of the rubber stopper 7, thereby preventing the rubber stopper 7 from being shifted in the axial direction. The retainer 8 also has electrical wire through-holes 8a that communicate with the through-holes of the rubber stopper 7.

Note that in the present embodiment, the crimping position using the crimp ring 6 is set to a position that is closer to the other end 5b of the joint pipe 5 than the retainer 8 that abuts against the rubber stopper 7.

Furthermore, a crimping tool (not shown) is used to crimp the joint pipe 5 and the metal pipe 3 that is fitted to the inner circumference of the joint pipe 5 into an octagonal shape in cross section (see FIG. 3(B)). Note that although the joint pipe 5 and the metal pipe 3 are crimped into an octagonal shape in cross section in the present embodiment, the joint pipe 5 and the metal pipe 3 may also be crimped into a square shape, a hexagonal shape, a decagonal shape, or the like.

Furthermore, a liquid or pasty sealing material is applied to the entire circumference along the abutting surfaces of the projection 3a of the metal pipe 3 and of the one end surface 5a of the joint pipe 5, and thereby a seal section 9 is formed at the terminal end on one side of the joint pipe 5.

Furthermore, the terminal end 5b on the other end of the joint pipe 5 is curved in the direction in which the diameter is increased. This structure prevents the electrical wires 2 that are inserted into the joint pipe 5 from abutting against the edge of the terminal end 5b on the other end of the joint pipe 5 and being damaged, and prevents the crimp ring 6 for fixing the metal braided section 4 from being removed. Moreover, this structure makes it easy for the rubber stopper 7 and the retainer 8 to be inserted into the joint pipe 5.

As described above, in the present embodiment, the metal pipe 3 and the metal braided section 4 that are made of different types of metal are connected to each other via the joint pipe 5 that is made of the same type of metal as the metal braided section 4, and the present embodiment has specifically the structure in which, in the first region R1, an end of the metal pipe 3 is inserted into the joint pipe 5 from one end thereof so as to be internally fitted and fixed to the joint pipe 5, and in the second region R2, an end of the metal braided section 4 covers the outer circumferential surface of the joint pipe 5 on the other end thereof and the metal braided section 4 and the joint pipe 5 are fixed by the crimp ring 6. Therefore, even when the contact section in which the joint pipe 5 and the metal braided section 4 covering the outer circumferential surface of the joint pipe 5 are in contact with each other gets wet, no corrosion occurs on account of the joint pipe 5 and the metal braided section 4 being made from the same type of metal. With respect to the metal pipe 3 that is internally fitted and fixed to the joint pipe 5, the rubber stopper 7 that is internally fitted and fixed to the joint pipe 5 can prevent water from entering the metal pipe 3 from the metal braided section 4, and thus it is possible to prevent a fit contact section 10 in which the joint pipe 5 and the metal pipe 3 that are made from different types of metal are fitted and in contact with each other from getting wet, preventing occurrence of corrosion in the fit contact section.

Furthermore, as described above, by crimping the joint pipe 5 and the metal pipe 3 that is fitted to the inner circumference of the joint pipe 5 into a polygonal shape (octagonal shape) in cross section, it is possible to enhance the fixing strength between the joint pipe 5 and the metal pipe 3, and to prevent water from entering the fit contact section 10 in which the joint pipe 5 and the metal pipe 3 are fitted and in contact with each other. Moreover, by providing the seal section 9 at the terminal of the joint pipe 5 on one end thereof, it is possible to prevent entry of water from the outer circumferential surface of the joint pipe 5 into the fit contact section 10 in which the joint pipe 5 and the metal pipe 3 are fitted and in contact with each other.

That is, according to the configuration of the present embodiment, it is not necessary to set the entire region from a connection section S at which the metal pipe 3 and the metal braided section 4 are connected to each other to a connector section (not shown) on the terminal side of the electrical wires that are inserted into the metal braided section 3 as a completely waterproofed region, and a water-stopping member such as a connector boot that is mounted on the connector section is also not needed. Therefore, it is possible to effectively prevent occurrence of corrosion in the connection section S at which the metal pipe 3 and the metal braided section 4 that are made from different types of metal are connected to each other, while achieving the connector section with a compact structure.

Figure 4:
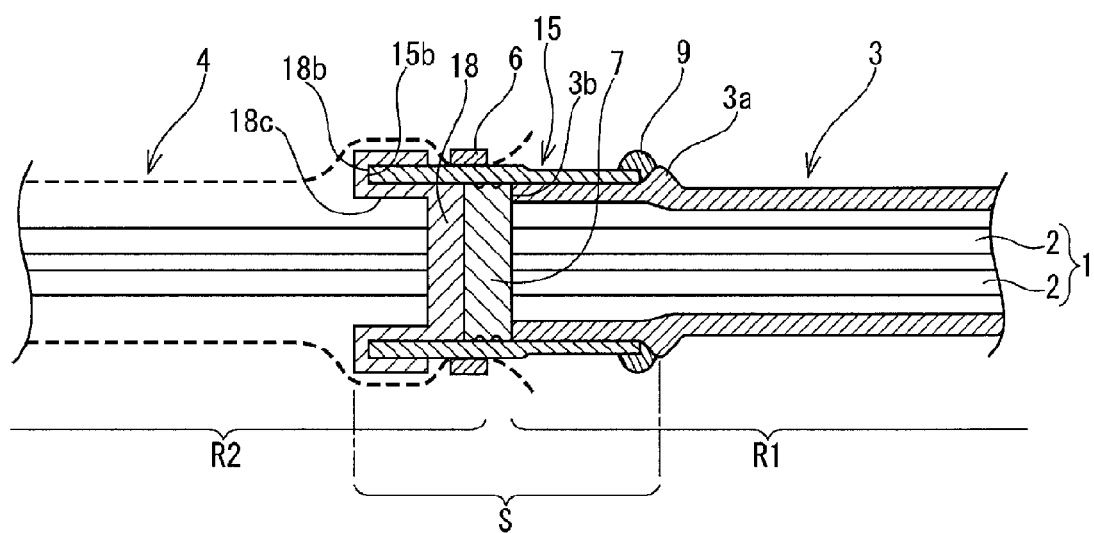
FIG. 4 is a schematic cross-sectional view showing a part of a wire harness according to a second embodiment.
Figure 5:
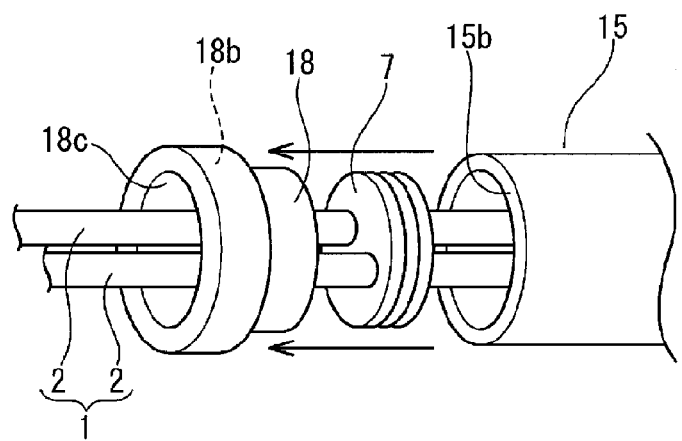
FIG. 5 illustrates a fit structure between a recess of a retainer and a terminal end of a joint pipe.

FIGS. 4 and 5 show a second embodiment.

In the second embodiment, a terminal end 15b on the other side of the joint pipe 15 is straight. Furthermore, a cylinder-shaped side wall 18c is provided projecting from the outer circumferential edge of the retainer 18, and the top end of the side wall 18c is bent so as to have a cross section of a recess, thereby forming a recess 18b, and the terminal end 15b on the other side of the joint pipe 15 is configured to be fitted into the recess 18b.

Furthermore, the position at which the metal braided section 4 and the joint pipe 15 are crimped and fixed to each other by the crimp ring 6 is changed from that in the first embodiment to a position that is closer to the central section in the axial direction of the joint pipe 15, and at which the rubber stopper 7 and the retainer 18 are internally fitted and fixed to the joint pipe 15.

Features other than the above-described features are the same as that in the first embodiment.

As described above, the edge of the terminal end 15b can be covered by the recess 18b by the straight terminal end 15b on the other end of the joint pipe 15 being fitted into the recess 18b provided on the top end of the side wall 18c of the retainer 18, and thereby it is possible to prevent the electrical wires from being damaged, and to ensure the retainer 18 to be fixed at a predetermined position in the joint pipe 15.

Figure 6:
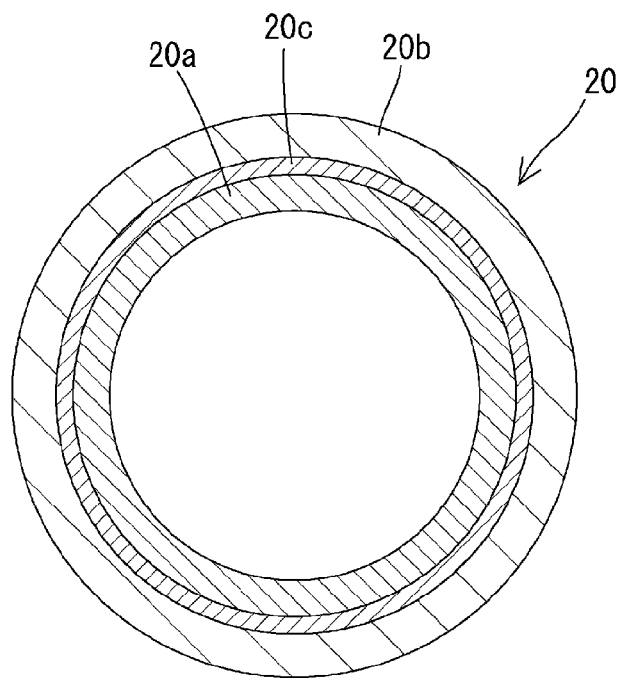
FIG. 6 is a cross-sectional view showing a metal pipe according to a third embodiment.
Figure 7:
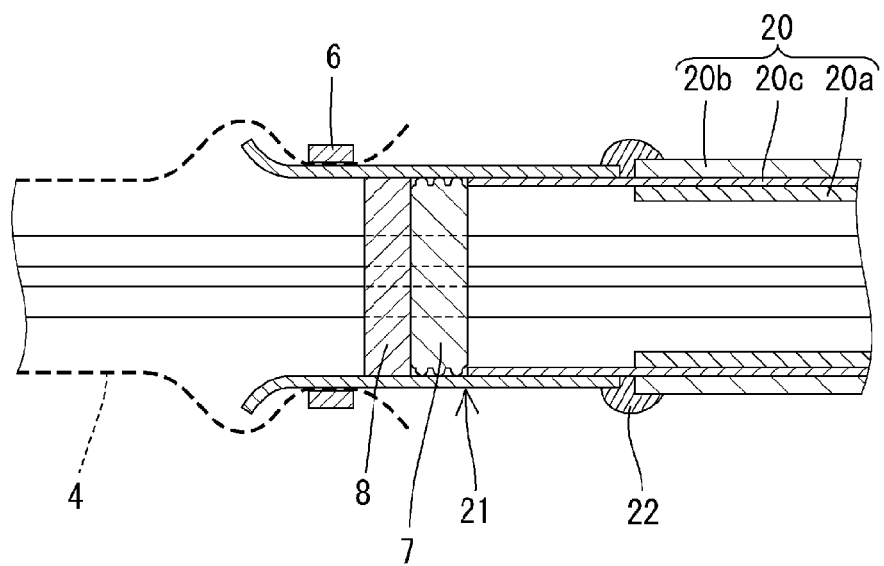
FIG. 7 is a schematic cross-sectional view showing a part of a wire harness according to the third embodiment.
Figure 8:
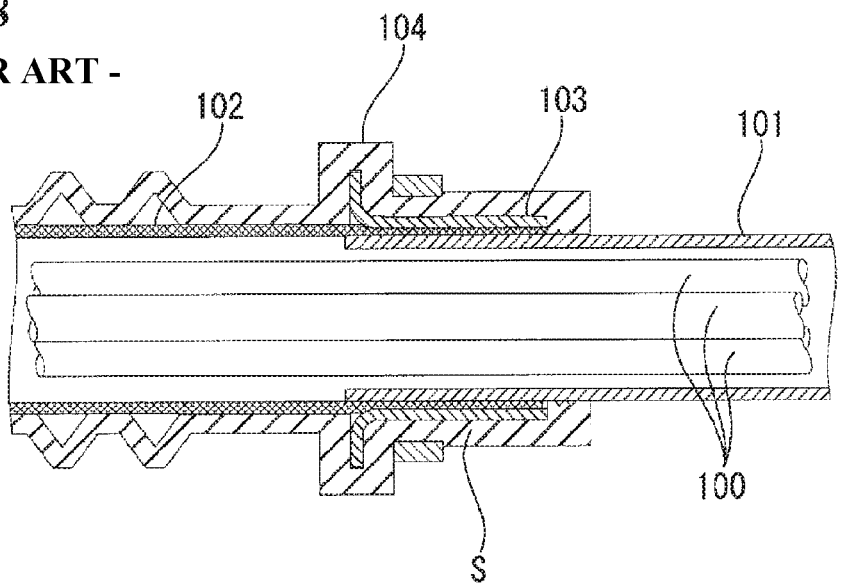
FIG. 8 is a diagram showing a conventional example.

FIGS. 6 and 7 show a third embodiment of the present invention.

In the third embodiment, a metal pipe 20 has a different configuration. That is, the metal pipe 20 according to the present embodiment has the three-layer structure in cross section as shown in FIG. 6. The innermost layer and the outermost layer are resin layers 20a and 20b, and the intermediate layer between the resin layers 20a and 20b is a metal layer 20c that is made of aluminum-based metal. Since the metal pipe 20 according to the present invention includes, inside thereof, the metal layer 20c in the length direction, shielding property is ensured over the entire length of the metal pipe 20. Accordingly, the "metal pipe" of the present invention also includes the configuration in which the metal layer 20c is inserted between the resin layers 20a and 20b.

As shown in FIG. 7, at an end of the above-described metal pipe 20 that is connected to the metal braided section 4, both the resin layers 20a and 20b, which are the outermost layer and the innermost layer, are removed over the same length range along the entire circumference of the metal pipe 20, and only the metal layer 20c is exposed over a predetermined length range.

Furthermore, one end of a joint pipe 21 is fitted onto the outer circumferential surface of the exposed metal layer 20c. Similarly to the first embodiment, the joint pipe 21 is made of iron-based metal whose surface is tin plated, and is connected to the metal pipe 20 by being crimped, together with the exposed metal layer 20c, by a crimping tool into an octagonal shape in cross section. Note that a sealing material 22 is applied over the entire circumference between the end of the joint pipe 21 and an end of the resin layer 20b, which is the outermost layer of the metal pipe 20.

Other structural features such as the metal braided section 4 are the same as those in the first embodiment, and their description thereof is omitted, giving the same reference numerals to the common configurations. Also in the third embodiment having such a configuration, the same functional effects as those of the first and second embodiments can be obtained.

The present invention is not limited to the foregoing embodiments, and the technical scope of the present invention includes, for example, the following embodiments:

(1) Although in the foregoing embodiments, the metal braided section 4 is made from copper-based metal bare wires whose surfaces are tin plated, and the joint pipe 5 is made of iron-based metal whose surface is tin plated. Both the components are not limited to the above-described types of metal, and various types of metal may be applied to the components as long as the metal that appears on the surfaces of the components are of the same type. Note that, in this context, "the same type of metal" refers to a combination of metal in which no corrosion (electrochemical corrosion) occurs by the contact section getting wet, or even when corrosion occurs, the corrosion does not practically pose a problem specifically when the components are used for a vehicle or the like, and "different types of metal" refer to a combination of metal in which corrosion occurs to the extent that it practically poses a problem.

(2) Furthermore, the joint pipe 5 may also be made of, instead of metal, an insulating material formed by a resin molded article. Also in this case, even when the contact section in which the joint pipe 5 and the metal braided section 4 covering the outer circumferential surface of the joint pipe 5 are in contact with each other gets wet, no corrosion will occur since they are not made of different types of metal.

(3) The seal section 9 may also be formed by mounting a rubber ring or the like, instead of applying a sealing material.

LIST OF REFERENCE NUMERALS

1 Wire harness
2 Electrical wire
3, 20 Metal pipe
4 Metal braided section
5, 15 Joint pipe
6 Crimp ring
7 Rubber stopper (elastic water-stopping member)
8, 18 Retainer
9 Seal section
R1 First region
R2 Second region

The invention claimed is:

1. A wire harness comprising:
a metal pipe into which an electrical wire is inserted;
a metal braided section that covers the electrical wire that is drawn out from the metal pipe, the metal braided section being formed by braiding metal bare wires; and
a joint pipe to one end of which the metal pipe is connected, and to the other end of which the metal braided section is connected,
the joint pipe being made of the same type of metal as the metal braided section or of an insulating material,
wherein an elastic water-stopping member through which the electrical wire is inserted while in intimate contact therewith is provided inward of a connection section at which the joint pipe and the metal pipe are connected to each other, the elastic water-stopping member being configured such that an outer circumferential surface thereof is in intimate contact with an inner circumferential surface of the connection section,
wherein a retainer that abuts against the elastic water-stopping member in an axial direction and positions the elastic water-stopping member in the axial direction is provided inward of the connection section at which the joint pipe and the metal pipe are connected to each other, and
the elastic water-stopping member being axially positioned between an end face of the metal pipe and the retainer.

2. The wire harness according to claim 1,
wherein the connection section at which the joint pipe and the metal pipe are connected to each other is crimped from the outer circumferential surface side into a polygonal shape.

3. The wire harness according to claim 1,
wherein the metal pipe is inserted into and connected to the joint pipe, and the metal pipe has a projection against which one end of the joint pipe abuts, the projection being formed at a position on the outer circumferential surface of the metal pipe that is close to an end thereof.

4. The wire harness according to claim 3,
wherein a seal section is formed over the entire circumference of a portion at which the one end of the joint pipe abuts against the projection, the seal section preventing entry of water from the portion at which the one end of the joint pipe abuts against the projection.

5. The wire harness according to claim 1,
wherein the retainer extends to a side opposite to the side on which the retainer abuts against the elastic water-stopping member, and is folded back to an outer circumferential side, and an end of the joint pipe is inserted into a recess that is formed in the folded-back section to a depth at which the end of the joint pipe abuts against the bottom of the recess.

* * * * *